(12) United States Patent
Miwa et al.

(10) Patent No.: US 8,525,078 B2
(45) Date of Patent: Sep. 3, 2013

(54) WELDING GUN

(75) Inventors: Hiroshi Miwa, Tochigi (JP); Koichi Matsumoto, Tochigi (JP); Teruaki Kobayashi, Tochigi (JP); Eisaku Hasegawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 265 days.

(21) Appl. No.: 12/967,333

(22) Filed: Dec. 14, 2010

(65) Prior Publication Data

US 2011/0147355 A1 Jun. 23, 2011

(30) Foreign Application Priority Data

Dec. 21, 2009 (JP) ................................. 2009-289512
Dec. 25, 2009 (JP) ................................. 2009-294004

(51) Int. Cl.
*B23K 9/00* (2006.01)
*B23K 9/10* (2006.01)

(52) U.S. Cl.
USPC ..................................... 219/136; 219/137.31

(58) Field of Classification Search
USPC ............... 219/76.1, 76.14, 137 R, 90, 55, 56, 219/61.6, 69.7, 78.01, 86.1, 121.53, 121.54
See application file for complete search history.

(56) References Cited

U.S. PATENT DOCUMENTS

| 4,104,551 | A | 8/1978 | Blank et al. |
| 4,387,314 | A | 6/1983 | Iwaki et al. |
| 6,177,744 | B1 | 1/2001 | Subler et al. |
| 2004/0208031 | A1 * | 10/2004 | Miwa et al. ................... 363/141 |

FOREIGN PATENT DOCUMENTS

| GB | 2236813 | 4/1991 |
| GB | 2450758 | 1/2009 |
| JP | 04-061453 | 5/1992 |
| JP | 05-003637 | 1/1993 |
| JP | 09-172750 | 6/1997 |
| JP | 09172750 A * | 6/1997 |
| JP | 2001-304382 | 10/2001 |
| JP | 2002-346752 | 12/2002 |
| JP | 2002346753 | 12/2002 |
| JP | 2002346756 | 12/2002 |
| JP | 2007-169639 | 7/2007 |
| JP | 2007-331447 | 12/2007 |
| JP | 2008-267572 | 11/2008 |
| WO | 2007/123266 | 11/2007 |

OTHER PUBLICATIONS

Chinese Office Action mailed Feb. 1, 2013 and English Translation, 9 pages.

* cited by examiner

*Primary Examiner* — Henry Yuen
*Assistant Examiner* — Thomas Ward
(74) *Attorney, Agent, or Firm* — Rankin, Hill & Clark LLP

(57) ABSTRACT

A welding gun precludes moisture from penetrating inside of a motor housing due by preventing development of negative pressure inside the motor housing. The welding gun includes a feed screw mechanism that is coupled to a servo motor and has a hollow rod that reciprocally moves in a predetermined direction by way of torque applied by the servo motor, and a moveable electrode tip that is connected to a leading end portion of the hollow rod and opens and closes relative to a fixed electrode tip according to the reciprocal movement of the hollow rod. The servo motor has a motor housing in which a motor housing hollow part accommodating a portion of the hollow rod to be reciprocally moveable is formed. A vent that ventilates the motor housing hollow part with ambient air is formed in the motor housing.

3 Claims, 10 Drawing Sheets

WELDING GUN

CROSS-REFERENCE TO RELATED APPLICATIONS

This application is based on and claims the benefit of priority from Japanese Patent Application No. 2009-289512, filed on 21 Dec. 2009, and Japanese Patent Application No. 2009-294004, filed on 25 Dec. 2009, the content of which is incorporated herein by reference.

BACKGROUND OF THE INVENTION

1. Field of the Invention

The present invention relates to a welding gun that is used in spot welding or the like. More specifically, the present invention relates to a welding gun that can prevent penetration of foreign matter into a hollow motor rotating mechanism provided with a hollow rotor rotatably accommodated inside a housing.

2. Related Art

Conventionally, a welding gun for spot welding has been used when overlapping and welding plate materials. In the welding gun, among a pair of electrode tips disposed to sandwich welding target members, one electrode tip is fixed and the other electrode tip is made to approach the welding target members and spot welding is performed. Thereafter, the other electrode tip is made to separate from the welding target member in order allow the welding target members to be moved.

As such a welding gun, a C-type welding gun has been known that is attached to a leading end of a robot arm, for example, and welds works that are retained between electrodes by linearly moving a moveable electrode tip relative to a fixed electrode tip (for example, refer to Japanese Unexamined Patent Application Publication No. 2002-346756). With this welding gun, a pressing rod is made to reciprocally travel by way of applying torque to a feed screw mechanism under the rotational action of a hollow motor rotating mechanism, whereby the moveable electrode tip connected to a leading end portion of the rod is made to approach or separate with respect to the fixed electrode tip. By configuring in this way, it is possible to weld works by causing electric current to pass between the electrode tips provided to a leading end of the welding gun, while compressing and retaining the works.

In addition, the above-mentioned welding gun includes an encoder that detects the rotation angle of a rotor applying torque on the feed screw mechanism in the hollow motor rotating mechanism. The welding gun plots the position of the moveable electrode tip from the rotation angle of the rotor detected by the encoder and the pitch of the feed screw mechanism, and causes the moveable electrode tip to approach or separate with respect to the fixed electrode tip.

Such a welding gun is made in a configuration with only a support bearing between the hollow rotor, which is made to rotate integrally with the threaded shaft of a ball screw that causes the pressing rod to reciprocally travel, and the housing that mounts the stator of the hollow motor rotating mechanism. As a result, foreign matter such as water and welding sputter may penetrate into the hollow motor rotating mechanism, which is enclosed by the housing and the hollow rotor. In this situation, in order to protect against the penetration of foreign matter into the hollow motor rotating mechanism in the welding gun of Japanese Unexamined Patent Application Publication No. 2002-346756, an oil seal is provided at an outer side of the support bearing supporting the pressing rod to protect against the penetration of foreign matter.

In addition, heat is generated in welding guns as a result of causing high current to pass between the electrode tips when performing spot welding. The heat generated from the welding gun is cooled by providing water passages in the welding gun for cooling, and flowing coolant in these water passages. However, if the coolant leaks from these water passages and this coolant reaches the encoder through the inside of the hollow motor rotating mechanism, a short circuit or the like will occur in the electronic substrate, a result of which a detection malfunction may occur in the encoder, and the position of the moveable electrode tip may not be accurately plotted.

A welding gun in which a seal member is installed is illustrated in Japanese Unexamined Patent Application Publication No. 2002-346753. This welding gun causes one electrode tip attached to a leading end portion of a rod of a feed screw mechanism, which is coupled to a hollow motor rotating mechanism, to open and close relative to another electrode tip that is fixed, by causing the rod to reciprocally travel. In addition, a seal member is installed in this welding gun at a holder leading end of a bushing that supports the reciprocally travelling rod. For this welding gun, it has been considered that there is room for improvement in the waterproofing property against coolant penetrating from between the motor housing and the hollow rotor to inside the motor housing when exchanging electrode tips.

SUMMARY OF THE INVENTION

With the welding gun described in Japanese Unexamined Patent Application Publication No. 2002-346753, coolant leaked from water passages and moisture condensed on the surface of the motor housing from cooling a hot welding gun will pool at the location where the seal member is installed, and gradually penetrate inside of the motor housing from the gap in the seal member. If there is such moisture and it reaches the encoder through the inside of the motor housing, contact failure or the like may occur, which may cause the position of the moveable electrode tip to not be accurately plotted.

As a primary cause of this water intrusion, there is a phenomenon whereby water is drawn into the gaps of sealing members by the inside of the motor housing becoming negative pressure. Next, the mechanism of this phenomenon will be explained. In the above-mentioned welding gun, a portion of the rod of the feed screw mechanism reciprocally moves inside the motor housing when one electrode tip is made to open and close relative to the other electrode tip. With this, the volume of a portion forming the space inside of the motor housing changes. When this happens, a space that is negative pressure relative to the ambient pressure outside the motor housing may occur inside the motor housing. In such a case, air will flow from outside the motor housing, through a gap between the motor housing and the rod inside the motor housing, into the inside of the motor housing. At this time, if moisture is clinging to the surface of the motor housing, this moisture may flow to inside the motor housing along with the air.

On the other hand, in a case of simply providing an oil seal on an outer side of the support bearing, which is an projecting-stroke side of the pressing rod, as with the welding gun described in Japanese Unexamined Patent Application Publication No. 2002-346756, the contact pressure of the oil seal will rise particularly when at low temperature such as when starting the pressing rod, whereby the resistance of the oil seal will increase. As a result, situations have arisen in which the pressing rod will not move when the pressing force on the pressing rod is low (e.g., 100 kgf pressure). In addition, since the material of the oil seal is rubber, the contact pressure changes due to temperature variation from the time of starting the pressing rod until reaching stable operation of the pressing rod. As a result thereof, the pressing force on the works may be falsely determined when pressing since drastic variability in the pressing force on the pressing rod will occur, and thus situations have also arisen in which problems occur in the control of the hollow motor rotating mechanism.

The present invention has an object of providing a welding gun for which moisture will not penetrate to inside of the motor housing. Furthermore, the present invention has an object of providing a welding gun that has stability in the pressing force against the pressing rod, even when at low pressure, and prevents foreign matter from entering to the hollow motor rotating mechanism, which includes a hollow rotor rotatably accommodated inside the housing.

A welding gun according to the present invention (e.g., the electric spot welding gun 1 described later) includes: a feed screw mechanism (e.g., the feed screw mechanism 40 described later) that is coupled to a servo motor (e.g., the servo motor 10 described later) configuring a hollow motor rotating mechanism and has a rod (e.g., the hollow rod 43 described later) that reciprocally moves in a predetermined direction by way of torque applied by the servo motor; and a moveable electrode tip (e.g., the moveable electrode tip 62 described later) that is connected to a leading end portion of the rod and opens and closes relative to a fixed electrode tip (e.g., the fixed electrode tip 61 described later) in accordance with reciprocal movement of the rod, in which the servo motor includes a motor housing (e.g., the motor housing 20 described later) in which a hollow part (e.g., the motor housing hollow part 25 described later) accommodating a portion of the rod so as to be reciprocally moveable is formed, and a vent (e.g., the vent 21b described later) that ventilates the hollow part with ambient air is formed in the motor housing.

The moveable electrode tip connected to the leading end portion of the rod is made to open and close relative to the fixed electrode tip by reciprocally moving the rod in a predetermined direction by way of torque applied from the servo motor. A portion of this rod reciprocally moves a hollow part formed in the motor housing of the servo motor. With this, the volume of the hollow part changes. However, according to the present invention, since the vent, which ventilates between the motor housing hollow part and ambient air, is formed in the motor housing, it is possible to absorb the pressure fluctuation relative to the ambient air due to the volume change of the hollow part.

Therefore, since the inside of the motor housing can be prevented from becoming negative pressure relative to ambient air, it is possible to provide a welding gun into which moisture will not penetrate inside the motor housing thereof, even if moisture clings to the top surface of the motor housing.

In this case, it is preferably to include an ambient air connection means (e.g., the muffler 70 described later) having a vent pipe (e.g., the vent pipe 72 described later) that has a first end connected to the vent and a second end disposed to be able to ventilate with ambient air, in which the ambient air connection means has a moisture barrier (e.g., the inner cover 73 described later) of a box shape that encloses around the second end of the vent pipe, and the moisture barrier is formed with an opening part (e.g., the side-surface opening part 73a described later).

According to the present invention one end of the vent pipe of the ambient air connection means is connected to the vent of the servo motor, a moisture barrier is provided that encloses around the other end of this vent, and this moisture barrier is formed with an opening part. With this, the other end of the vent pipe connected to the vent can be open to ambient air, and it is possible for the moisture barrier to prevent moisture from flowing into the inside of the motor housing through the vent pipe.

In this case, the ambient air connection means preferably has a filter (e.g., the filter 76 described later) that covers around the other end inside of the moisture barrier.

According to the present invention, since the filter is provided that covers around the other end of the vent pipe inside of the moisture barrier, it is possible to capture foreign matter suspended in the ambient air. Therefore, it is possible to prevent foreign matter from entering inside the motor housing via the vent pipe. Herein, foreign matter refers to dust scattering in a factory in which the welding gun is installed, sputter scattering from metal surfaces during welding, or the like.

A welding gun according to the present invention includes: a hollow motor rotating mechanism including a hollow rotor that is rotatably accommodated inside a housing; and a pressing rod that moves to project from the housing when the hollow rotor is rotating, in which the welding gun has, in an end portion of the housing on a side thereof from which the pressing rod projects, a noncontact-type labyrinth seal that seals a gap between the housing and the hollow rotor.

According to this configuration, the welding gun according to the present invention can prevent the penetration of foreign matter to the hollow motor rotating mechanism, which is enclosed by the housing and the hollow rotor, even in a case of foreign matter having penetrated to inside of the hollow rotor, for example, since a noncontact-type labyrinth seal that seals a gap between the housing and the hollow rotor is provided in an end portion of the housing on a side thereof from which the pressing rod projects.

In addition, since the gap between the housing and the hollow rotor is sealed in a noncontact state by the labyrinth seal, it is not easily influenced by the characteristics of the oil seal used in a sealing member, particularly when at low temperature such as when starting the pressing rod. Therefore, the frictional resistance between the housing and the hollow rotor can be reduced also when at low temperature. With this, the hollow rotor can be easily rotated with little force to move the pressing rod with low pressing force, and a situation in which the pressing rod will not move due to a temperature change can be prevented from occurring. In addition, since the pressing rod can be moved despite temperature changes, a stable pressing force can be provided to the pressing rod, irrespective of temperature changes in the pressing rod, such as when starting the pressing rod or during stable operation of the pressing rod. According to the welding gun of the present invention configured in this way, it is possible to prevent foreign matter from entering a hollow motor rotating mechanism that has stability in the pressing force on the pressing rod, even when at low temperature and low pressure, and includes a hollow rotor rotatably accommodated inside the housing.

In this case, it is preferable for the labyrinth seal to be configured to include: an inner seal of a wave shape that is disposed on a side of the hollow rotor; and an outer seal that is disposed to face the inner seal, and is disposed on an outer side of the inner seal on a side of the housing in a noncontact state with the inner seal, in which a grease having a self-sealing property is enclosed in a gap between the inner seal and the outer seal. In the present specification, "self-sealing property" indicates a characteristic of filling gaps by way at swelling deformation, and "grease having a self-sealing property" indicates a grease having such a characteristic.

According to this configuration, the welding gun of the present invention can prevent the grease enclosed in the labyrinth seal from discharging to outside of the gap, even in a case of the hollow rotor rotating from the rotation of the hollow motor rotating mechanism, since the grease adheres tightly in the gap between the inner seal and the outer seal, and retains this state. Therefore, the penetration of foreign matter to the hollow motor rotating mechanism, which is enclosed by the housing and the hollow rotor, can be prevent even in a case of the hollow rotor being used for an extended period of time. Herein, the assumed revolution speed of the hollow rotor rotating may be considered to be no more than 3,000 rpm for the case of a welding gun, for example.

According to the present invention, it is possible to prevent foreign matter from entering a hollow motor rotating mechanism that has stability in the pressing force against a pressing rod, even when at low temperature or low pressure, and that includes a hollow rotor rotatably accommodated inside the housing.

According to the present invention, a welding gun can be provided into which moisture will not penetrate into the motor housing due to preventing the inside of the motor housing from becoming negative pressure.

DETAILED DESCRIPTION OF THE INVENTION

Figure 1:
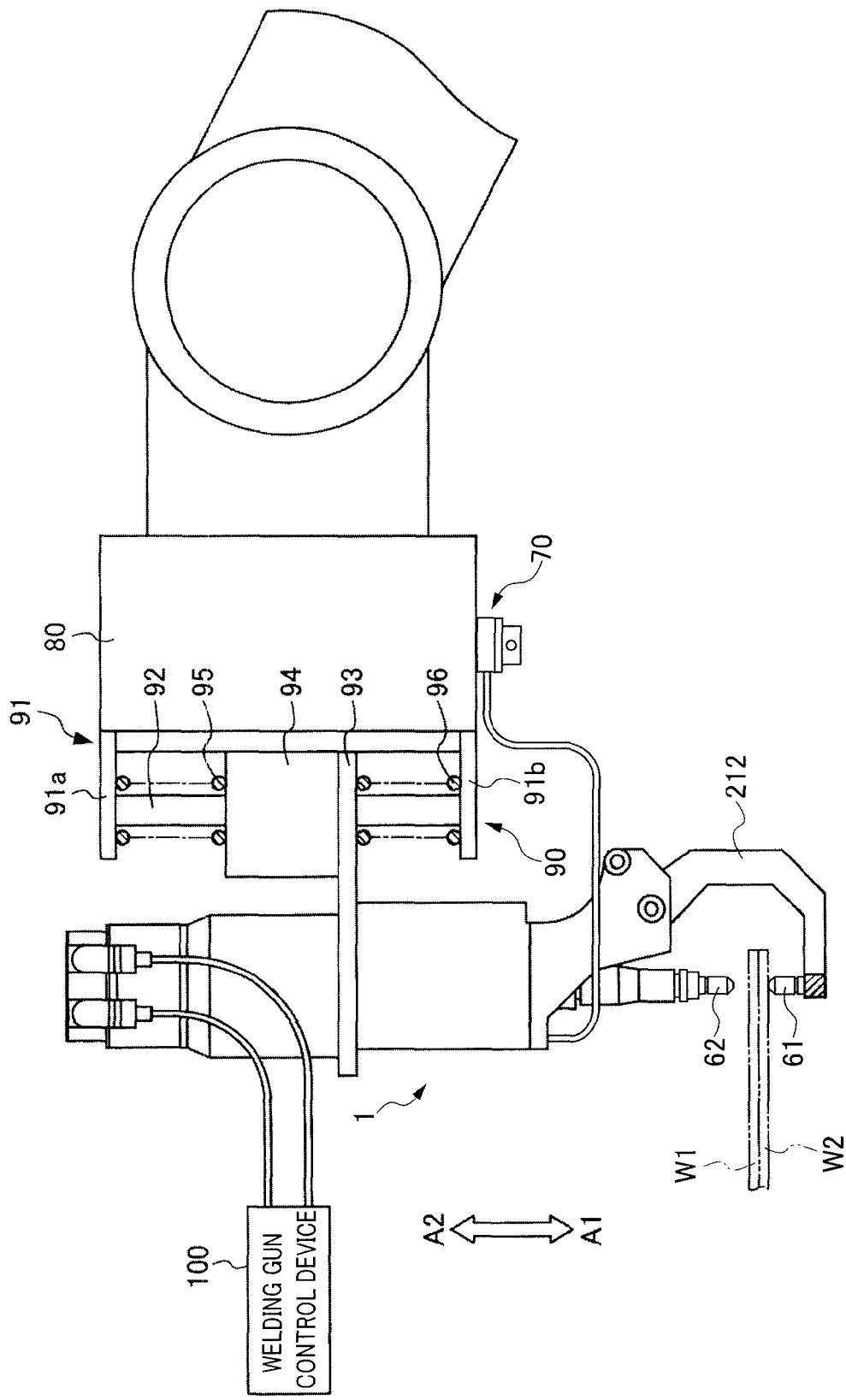
FIG. 1 is a partial simplified side view showing an electric spot welding gun according to a first embodiment of the present invention attached to a leading end of a robot arm.

Hereinafter, a first embodiment of the present invention will be explained with reference to the drawings. FIG. 1 is a partially simplified side view showing an electric spot welding gun 1 according to the first embodiment of the present invention in a state of being attached to a leading end of a robot arm 80. The electric spot welding gun 1 is attached to a gun support portion 90 provided to a leading end of the robot arm 80. In addition, a welding gun control device 100 is electrically connected to the electric spot welding gun 1. Moreover, the electric spot welding gun 1 is configured as a C-type welding gun that reciprocally moves a moveable electrode tip 62 in an arrow A1 direction or an arrow A2 direction relative to a fixed electrode tip 61, which is fixed at a leading end side (arrow A1 side shown in FIG. 1) by a fixed electrode tip mounting portion 212, to open and close between the fixed electrode tip 61 and the moveable electrode tip 62, as described later. Furthermore, the electric spot welding gun 1 includes a muffler 70 that is designed to be able to ventilate the interior thereof with ambient air. This muffler 70 is attached to the robot arm 80.

The gun support portion 90 includes a gun support bracket 91, and this gun support bracket 91 includes a top plate 91a and a bottom plate 91b that extends in parallel with this top plate 91a. A guide bar 92 is bridged between the top plate 91a and the bottom plate 91b.

A plate 93, which is slidable in the axial direction of the guide bar 92 and parallel to the top plate 91a and the bottom plate 91b, fits to the guide bar 92. A support 94 of a cabinet shape is arranged on top of the plate 93 on a side near the robot arm 80, and a first coil spring 95 wound around the guide bar 92 is interposed between the top plate 91a and the support 94. Similarly, a second coil spring 96 wound around the guide bar 92 is interposed between the bottom plate 91b and the plate 93.

In addition, the plate 93 fastens and retains the electric spot welding gun 1 on a side separated from the robot arm 80. The electric spot welding gun 1 is disposed so as to position works W1 and W2, which are welding target components, between the fixed electrode tip 61 and the moveable electrode tip 62, by way of the movement of the robot arm 80 and the gun support portion 90. Then, according to the control of the welding gun control device 100, the electric spot welding gun 1 causes the moveable electrode tip 62 to move relative to the fixed electrode tip 61 to the arrow A1 side, and then welds the works W1 and W2 together.

Figure 2:
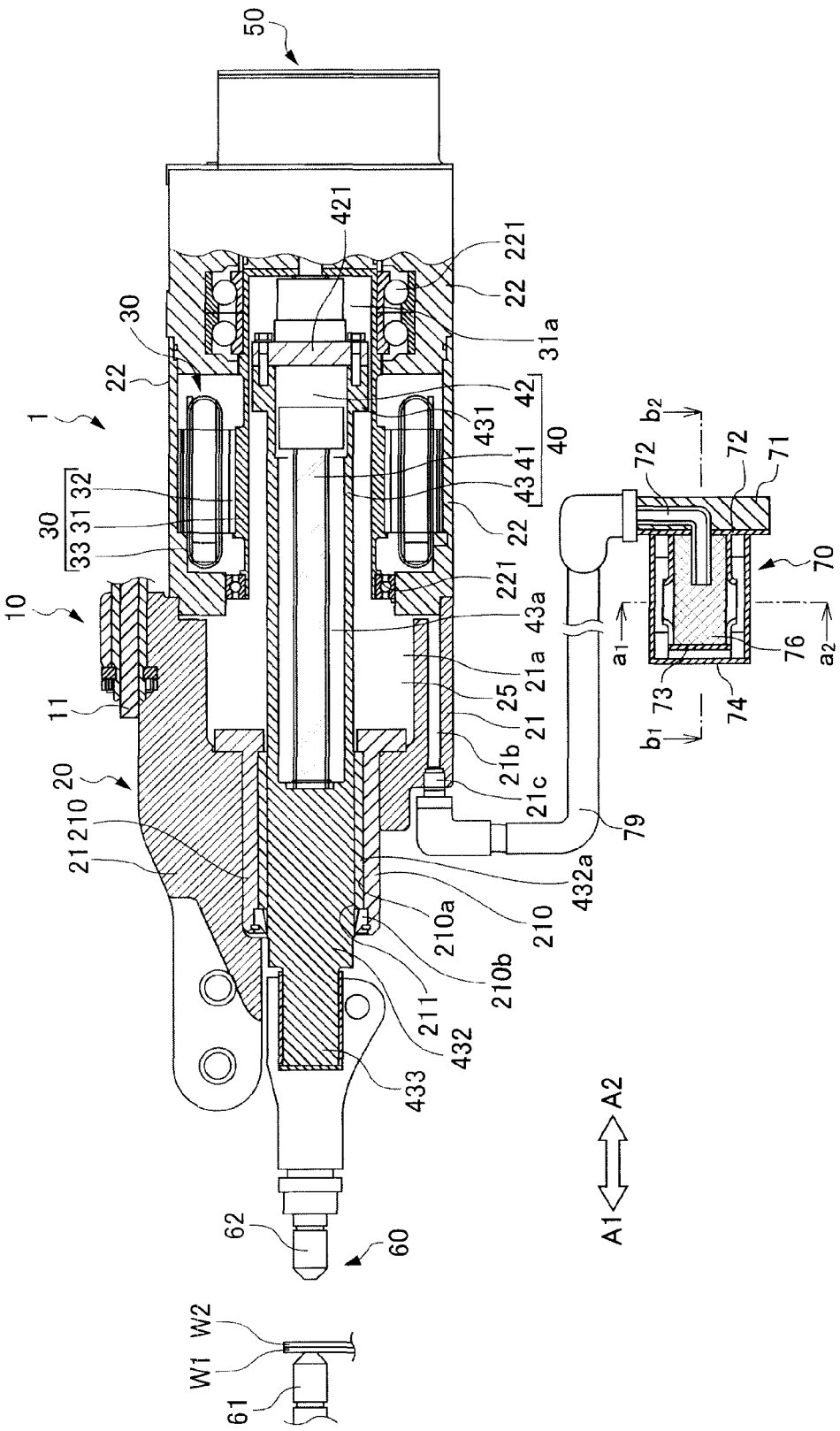
FIG. 2 is a view showing an outline configuration of the electric spot welding gun according to the embodiment.

Next, the configuration of the electric spot welding gun 1 will be explained. FIG. 2 is a view showing an outline configuration of the electric spot welding gun according to the present embodiment.

The electric spot welding gun 1 includes a servo motor 10 having a hollow structure configuring a hollow motor rotating mechanism, a feed screw mechanism 40 coupled to the servo motor 10 at a base end side thereof (arrow A2 side shown in FIG. 2), an encoder portion 50 connected to the servo motor 10, an electrode tip 60 provided to a leading end side (arrow A1 side shown in FIG. 2) of the feed screw 40, and the muffler 70 as an ambient air connection means connected to the servo motor 10. The servo motor 10 has a hollow rotor 31 that rotationally drives. The feed screw mechanism 40 is disposed inside of the hollow rotor 31, and has a hollow rod 43 that reciprocally moves in a predetermined direction by way of the torque applied from the hollow rotor 31. The encoder portion 50 detects the rotation angle of the hollow rotor 31. The electrode tips 60 are a pair of electrode tips that sandwich and weld the works W1 and W2, and include a fixed electrode tip 61 and a moveable electrode tip 62, which is connected to a leading end portion of the hollow rod 43. The muffler 70 is connected to the servo motor 10 via a connection hose 79.

Hereinafter, the details of each configuration of the electric spot welding gun 1 will be explained. The servo motor 10 includes a motor housing that forms a main body of the electric spot welding gun 1 and accommodates a portion of the feed screw mechanism 40, and a motor 30 that is accommodated in the motor housing 20 and rotationally drives the hollow rotor 31 by way of electric power supplied from the welding gun control device 100 (refer to FIG. 1).

The motor housing 20 includes a casing 21 that supports a leading end side (arrow A1 side shown in FIG. 2) of the feed screw mechanism 40, and a motor cover 22 that is coupled to a base end side (arrow A2 side shown in FIG. 2) of the casing 21 and accommodates the motor 30.

The casing 21 has a rod support portion 210 that supports a leading end side (arrow A1 side shown in FIG. 2) of the hollow rod 43 of the feed screw mechanism 40 to be reciprocally moveable. A portion of the hollow rod 43 travels in and out of the motor housing 20 by sliding and passing through this rod support portion 210. A rod-support portion hollow part 211 through which the hollow rod 43 passes is formed in the rod support portion 210. A plurality of spline grooves 210a extending in the direction in which the hollow rod 43 reciprocally moves is formed in an inside wall forming the rod-support portion hollow part 211 in the rod support portion 210. These spline grooves 210a engage to be reciprocally moveable with splines 432a formed in the hollow rod 43 described later. With this, the hollow rod 43 reciprocally moves without being allowed to rotate.

In addition, an end seal portion 210b is provided in the rod support portion 210 at an external end of the inside wall formed by the rod-support portion hollow part 211. An oil seal is press fit into the end seal portion 210b. With this, it is possible to prevent moisture or the like from penetrating to inside the motor housing 20 via the rod support portion 210 when cooling the electric spot welding gun 1 by way of a coolant, for example.

In addition, a casing hollow part 21a that accommodates a portion of the hollow rod 43 to be reciprocally moveable is formed in the casing 21. Furthermore, a vent 21b that penetrates from the surface coming into contact with ambient air to the casing hollow part 21a is formed in the casing 21. The air pressure in this casing hollow part 21a and the ambient air can be kept substantially equal by ventilating inside the casing hollow part 21a with ambient air by way of this vent 21b. A vent joint 21c that is connected at an end portion on an ambient air side by an end of the connection hose 79 is provided to the vent 21b. In addition, a connecting member 11 that connects the electric spot welding gun 1 to the robot arm 80 (refer to FIG. 1) is provided to the casing 21.

The motor cover 22 is connected to an end portion of the casing 21 in an opposite direction (arrow A2 direction shown in FIG. 2) to the direction (arrow A1 direction shown in FIG. 2) in which the rod support portion 210 is provided.

The motor 30 includes a hollow rotor 31 formed in a tube shape, a magnet 32 of a ring-shape that is adhered to the outer circumference of the hollow rotor 31, and a coil 33 of a ring-shape disposed at a position facing this magnet 32.

A rotor hollow part 31a accommodating a portion of the hollow rod 43 of the feed screw mechanism 40 to be reciprocally movable is formed in the hollow rotor 31. The rotor hollow part 31a is made to be a continuous space linked with the casing hollow part 21a of the casing 21, together forming a motor housing hollow part 25. In other words, a portion of the hollow rod 43 reciprocally moves in this motor housing hollow part 25. In addition, the air pressure inside this motor housing hollow part 25 and the ambient air can be kept substantially equal by way of the vent 21b in the casing 21.

The coil 33 generates a magnetic field by passing electric current therethrough in accordance with the electric power supplied from the welding gun control device 10 (refer to FIG. 2). The hollow rotor 31 rotates by way of the interaction between the magnetic field generated by this coil 33 and the magnetic field of the magnet 32 adhered to the hollow rotor 31.

The feed screw mechanism 40 includes a ball screw 41 coupled to the hollow rotor 31 of the motor 30, a nut portion 42 that threads together with this ball screw 41, and the hollow rod 43 fixed to this nut portion 42. With this, the ball screw 41 rotates in conjunction with rotation of the hollow rotor 31. The nut portion 42 reciprocally moves in a direction (from arrow A2 to A1 direction shown in FIG. 2) in which this ball screw 41 extends, in conjunction with rotation of the ball screw 41. The hollow rod 43 reciprocally moves in conjunction with reciprocal movement of the nut portion 42.

The ball screw 41 has a base end (arrow A2 side base end shown in FIG. 2) coupled to the hollow rotor 31, and extends to substantially the center of the motor housing hollow part 25. The nut portion 42 is formed with a slightly smaller diameter relative to the diameter of the rotor hollow part 31a, and has a hollow rod mounting portion 421, which is fixed by the hollow rod 43.

The hollow rod 43 includes a base end portion 431 formed with substantially the same diameter as the hollow rod mounting portion 421 and coupled to this hollow rod mounting portion 421, a shaft 432 that extends from this base end portion 431, slides and passes through the rod support portion 210 of the casing 21, to project to outside, and a moveable electrode tip mounting portion 433 that is provided to a leading end (arrow A1 side end portion shown in FIG. 2) of this shaft 432 and to which the moveable electrode tip 62 among the electrode tips 60 is attached. In this way, the nut portion 42 and the hollow rod mounting portion 421 of the feed screw mechanism 40 are formed with a slightly smaller diameter relative to the diameter of the rotor hollow part 31a. With this, it is possible to prevent the feed screw mechanism 40 from shaking in a direction substantially orthogonal to the extending direction of the shaft 432 (from arrow A2 to A1 direction shown in FIG. 2).

A rod hollow part 43a inside which the ball screw 41 of the motor 30 is formed in the shaft 432. In addition, splines 432a, which engage with a plurality of spline grooves 210a formed in an inner wall forming the rod-support portion hollow part 211, are formed in the shaft 432 in a portion sliding against the rod support portion 210. In this way, the splines 432a mutually engage with the spline grooves 210a. With this, the hollow rod 43 reciprocally moves in a direction in which the shaft 432 extends, without being allowed to rotate in conjunction with rotation of the ball screw 41.

The encoder portion 50 is connected to the hollow rotor 31. The encoder portion 50 includes an encoder main body that detects the rotation angle of the hollow rotor 31 and transmits an electrical signal to the welding gun control device 100 (refer to FIG. 1), an input shaft that projects from this encoder main body and couples with the hollow rotor 31, and a cover that covers these.

The fixed electrode tip 61 is detachably mounted to the fixed electrode tip mounting portion 212 (refer to FIG. 1) extending from the casing 21. The moveable electrode tip 62 is detachably mounted to the moveable electrode tip mounting portion 433 of the hollow rod 43, and opens and closes relative to the fixed electrode tip 61 according to the reciprocal movement the hollow rod 43.

The muffler 70 includes a muffler base 71 to which another end of the connection hose 79 is connected, a vent pipe 72 that is plumbed to the inside of this muffler base 71, an inner cover 73 as a first moisture barrier that encloses around an end portion of this vent pipe 72, an outer cover 74 as a second moisture barrier that encloses around this inner cover 73, a cover base plate 75 to which the inner cover 73 and the outer cover 74 are mounted, and a filter 76 that covers around an end portion of the vent pipe 72 inside of the inner cover 73. The muffler 70 is mounted to the robot arm 80, gun support portion 90, gun support bracket 91, and the like shown in FIG. 1. The muffler 70 is preferably mounted in the vicinity of the servo motor 10.

Figure 3:
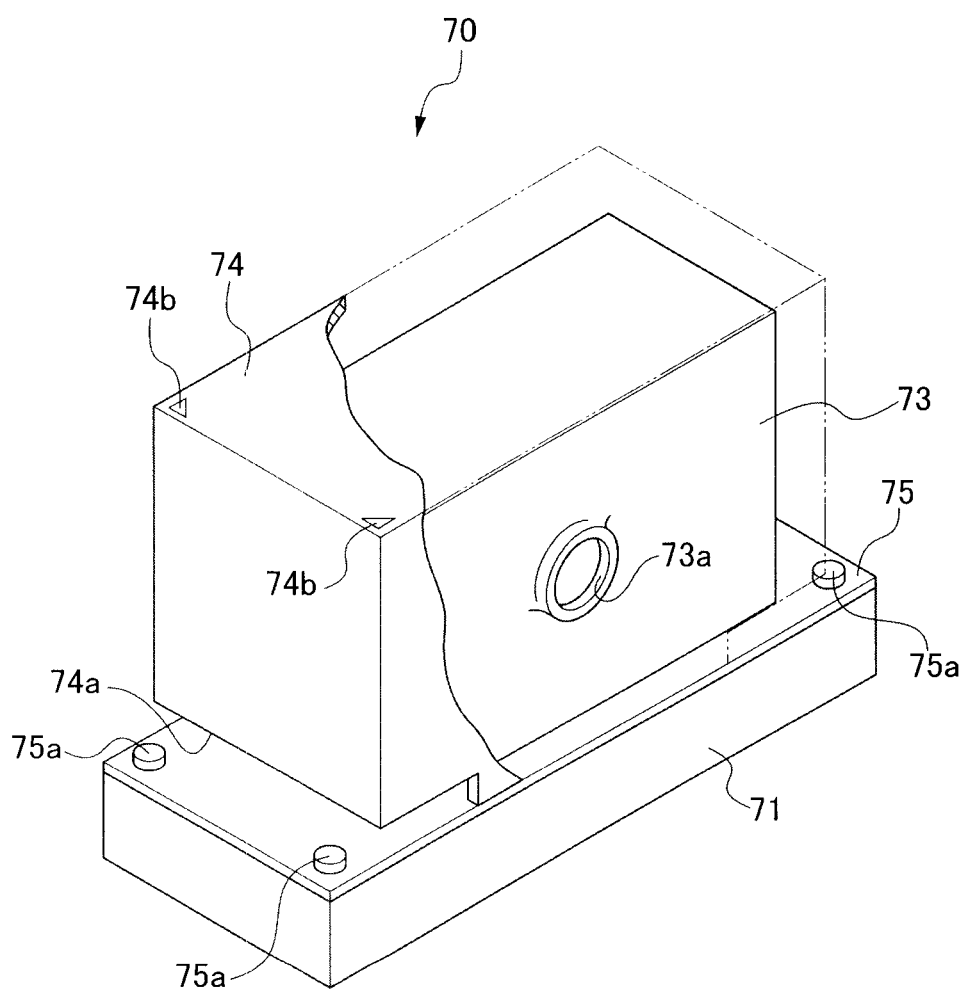
FIG. 3 is a view showing an outline configuration of a muffler according to the embodiment.
Figure 4:
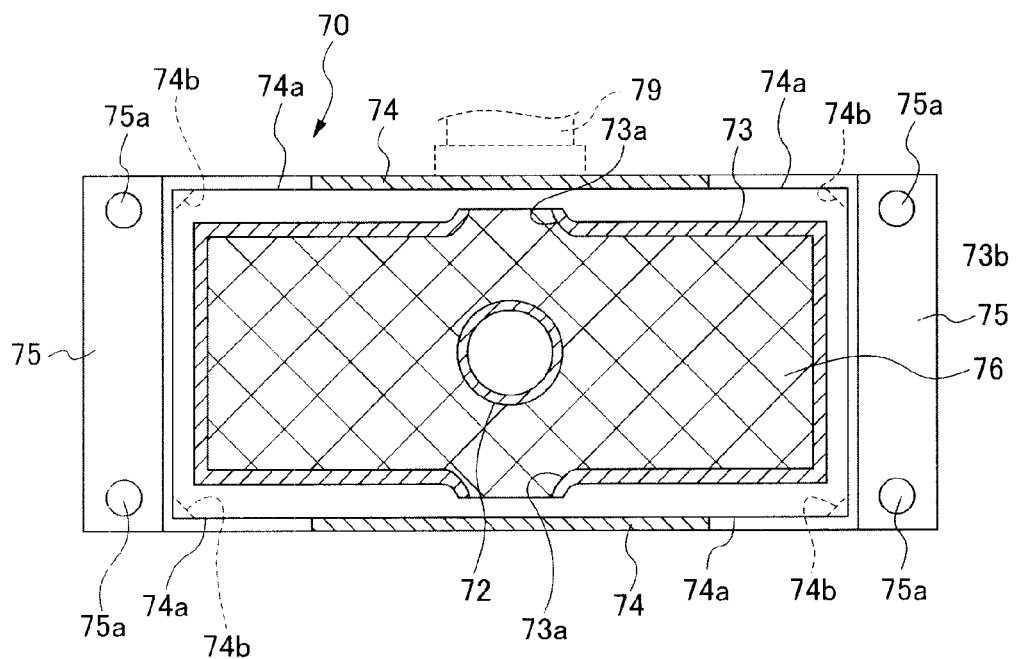
FIG. 4 is a cross-sectional view in the a1, a2 direction shown in FIG. 1 of the muffler according to the embodiment.
Figure 5:
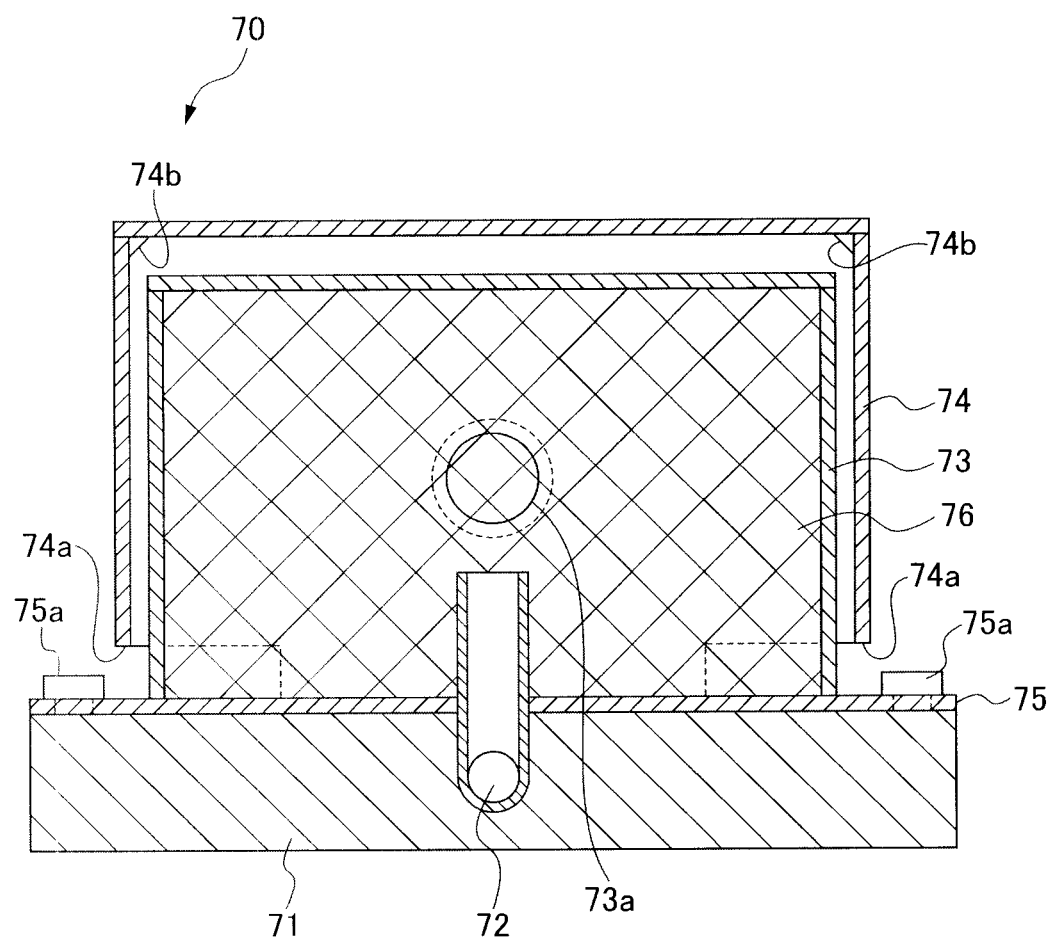
FIG. 5 is a cross-sectional view in the b1, b2 direction shown in FIG. 1 of the muffler according to the embodiment.

Hereinafter, the details of each configuration of the muffler 70 will be explained. FIG. 3 is a view showing an outline configuration of the muffler 70 according to the present embodiment. FIG. 4 is a cross-sectional view in the a1, a2 direction shown in FIG. 2 of the muffler 70 according to the present embodiment. FIG. 5 is a cross-sectional view in the b1, b2 direction shown in FIG. 2 of the muffler 70 according to the present embodiment.

The muffler base 71 is substantially rectangular, has a bottom surface fixed to abut the robot arm 80 (refer to FIG. 2), another end of the connection hose 79 connected to a side surface thereof, and the cover base plate 75 is fixed to the surface that faces the bottom surface.

The vent pipe 72 is a tubular body formed in a substantially L-shape, has one end breathably connected to the other end of the connection hose 79 connected to the muffler base 71, and another end projecting from a surface of the muffler base 71. In this way, it is possible to prevent moisture moving along the top surface of the muffler base 71 from flowing into the inside of the vent pipe 72 by causing the other end of the vent pipe 72 to project from the surface of the muffler base 71.

The inner cover 73 is a box having an opening surface that is open, and this opening surface is mounted to the cover base plate 75. In other words, the inner cover 73 encloses the other end of the vent tube 72 that projects from the surface of the muffler base 71. In addition, the inner cover 73 has side-surface opening parts 73a of a circular shape, each in a side surface facing each other. With this, the inner cover 73 can enclose the other end of the vent pipe 72 in a breathable state. Furthermore, in the side surfaces of the inner cover 73, the edges forming the side-surface opening parts 73a are slightly bent toward the outside. With this, it is possible to prevent moisture from penetrating inside, even if the moisture temporarily clings to the outside of the surface of the inner cover 73.

The outer cover 74 is a box having an opening surface that is open, is formed to be larger than the inner cover 73, and the opening surface thereof is mounted to the cover base plate 75. In other words, the outer cover 74 encloses the inner cover 73 to interpose a layer of air. With this, it is possible to make the atmospheric temperature change inside of the inner cover 73 relative to the atmospheric temperature outside of the outer cover 74 to be gradual, whereby condensation can be prevented from forming on the inside of the inner cover 73. In addition, the outer cover 74 has outer-cover skirt openings 74a on side surfaces different from the side surfaces facing a side surface of the inner cover 73 in which a side-surface opening part 73 is formed. With this, the outer cover 74 can enclose the inner cover 73 in a breathable state. In addition, the outer cover 74 has exterior cutouts 74b in the four corners of the ceiling surface facing the opening surface. With this, moisture can escape from the exterior cutouts 74b, even if the moisture temporarily clings to the inside surfaces of the outer cover 74.

The cover base plate 75 is a plate-like body formed in substantially the same shape as the surface of the muffler base 71. The vent pipe 72 passes through this cover base plate 75, and the other end thereof is disposed inside of the inner cover 73. The cover base plate 75 is fixed in four corners to the surface of the muffler base 71 with bolts 75a.

The filter 76 is formed by laminating sponge filters, and is disposed in a gap between the inner cover 73 and the vent pipe 72. With this, even if foreign matter were to enter inside of the inner cover 73 from the side-surface opening part 73a, for example, since it would be captured by the filter 76, it is possible to prevent this foreign matter from entering inside the vent pipe 72.

Figure 6:
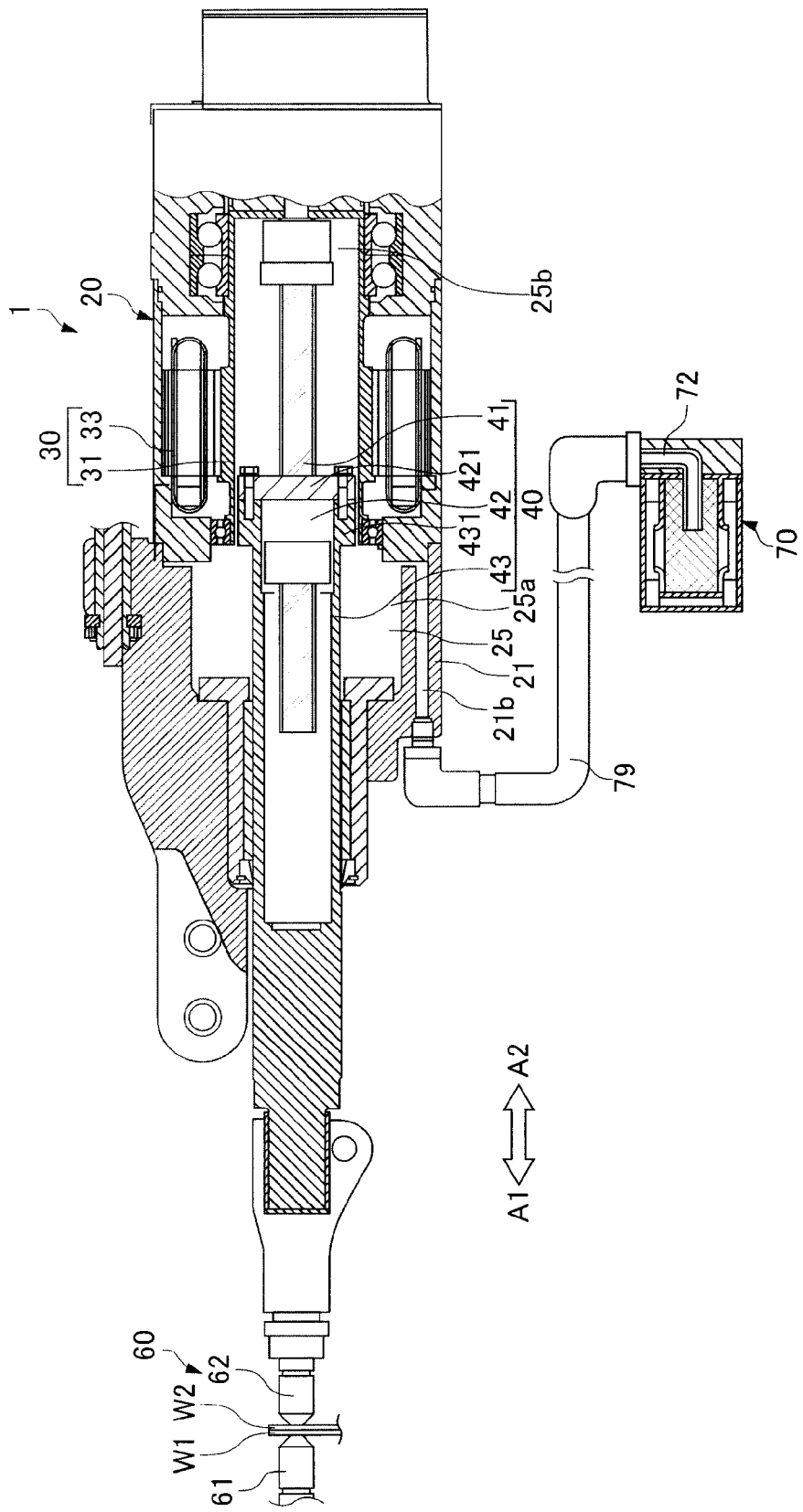
FIG. 6 is a view showing a state in which a pair of electrode tips of the electric spot welding gun according to the embodiment are closed.

Next, operations of the electric spot welding gun 1 will be explained. FIG. 6 is a view showing a state in which the pair of electrode tips 60 of the electric spot welding gun 1 according to the present embodiment is closed. First, operations to transition the pair of electrode tips 60 of the electric spot welding gun 1 from an opened state to a closed state will be explained. In the electric spot welding gun 1, when electric power is supplied from the welding gun control device 100 (refer to FIG. 1) to the coil 33 of the motor 30, the hollow rotor 31 rotates in the predetermined direction. The ball screw 41 of the feed screw mechanism 40 also rotates in conjunction with rotation of this hollow rotor 31, and the nut portion 42 and the hollow rod 43 move to the leading end side (arrow A1 side shown in FIG. 6) of the ball screw 41. With this, the moveable electrode tip 62 mounted to the leading end of the hollow rod 43 closes relative to the fixed electrode tip 61, whereby the works W1 and W2 are compressed and retained. In this state, high current is supplied between the fixed electrode tip 61 and the moveable electrode tip 62, whereby the works W1 and W2 are spot welded.

Herein, when the fixed electrode tip 61 and the moveable electrode tip 62 are in the closed state as shown in FIG. 6, the motor housing hollow part 25 of the motor housing 20 interposes the hollow rod mounting portion 421 of the nut portion 42 and the base end portion 431 of the hollow rod 43, and is split between a leading-end side hollow part 25a and a base-end side hollow part 25b. In other words, although the hollow rod mounting portion 421 and base end portion 431 are only slightly separated from the hollow rotor 31, an anti-friction material is applied between these. With this, the leading-end side hollow part 25a and the base-end side hollow part 25b may not be in communication to able to ventilate.

Next, in a case of the moveable electrode tip 62 opening relative to the fixed electrode tip 61, the hollow rotor 31 counter-rotates in a predetermined direction according to control by the welding gun control device, and the hollow rod mounting portion 421 and the base-end portion 431 move inside the motor housing hollow part 25 to the base end side of the ball screw 41 (arrow A2 side shown in FIG. 6). With this, the volume of the leading-end side hollow part 25a expands, and the volume of the base-end side hollow part 25b contracts. The leading-end side hollow part 25a becomes negative pressure relative to ambient air due to expansion of the volume. When this is done, the ambient air flows into the vent pipe 72 of the muffler 70, and this ambient air flows into the leading-end side hollow part 25a via the connection hose 79 and the vent 21b formed in the casing 21.

There are the following operational effects according to the present embodiment. The moveable electrode tip 62 connected to the leading end portion of the hollow rod 43 is made to open and close relative to the fixed electrode tip 61 by reciprocally moving the hollow rod 43 in a predetermined direction by way of torque applied from the servo motor 10. A portion of this hollow rod 43 reciprocally moves the motor housing hollow part 25 formed in the motor housing 20 of the servo motor 10. With this, the volume of the motor housing hollow part 25 changes. However, according to the present embodiment, since the vent 21b, which ventilates between the motor housing hollow part 25 and ambient air, is formed in the motor housing 20, it is possible to absorb the pressure fluctuation relative to the ambient air due to the volume change of the motor housing hollow part 25.

Therefore, since the inside of the motor housing can be prevented from becoming negative pressure relative to ambient air, it is possible to provide a welding gun into which moisture will not penetrate inside the motor housing thereof, even if moisture clings to the surface of the motor housing.

In addition, an end of the vent pipe 72 of the muffler 70 connects to the vent 21b of the servo motor 10, the inner cover 73 is provided that encloses around the other end of this vent pipe 72, and the side surface opening parts 73a are formed in this inner cover 73. With this, the other end of the vent pipe 72 connected to the vent 21b can be open to ambient air, and the inner cover 73 can prevent moisture from flowing into the inside of the motor housing through the vent pipe 72.

In addition, since the filter 76 that covers around the other end of the vent pipe 72 is provided inside of the inner cover 73, it is possible to capture foreign matter suspended in the ambient air. Therefore, it is possible to prevent foreign matter from entering inside the motor housing via the vent pipe 72.

Hereinafter, a second embodiment of the present invention will be explained based on the drawings.

Figure 7:
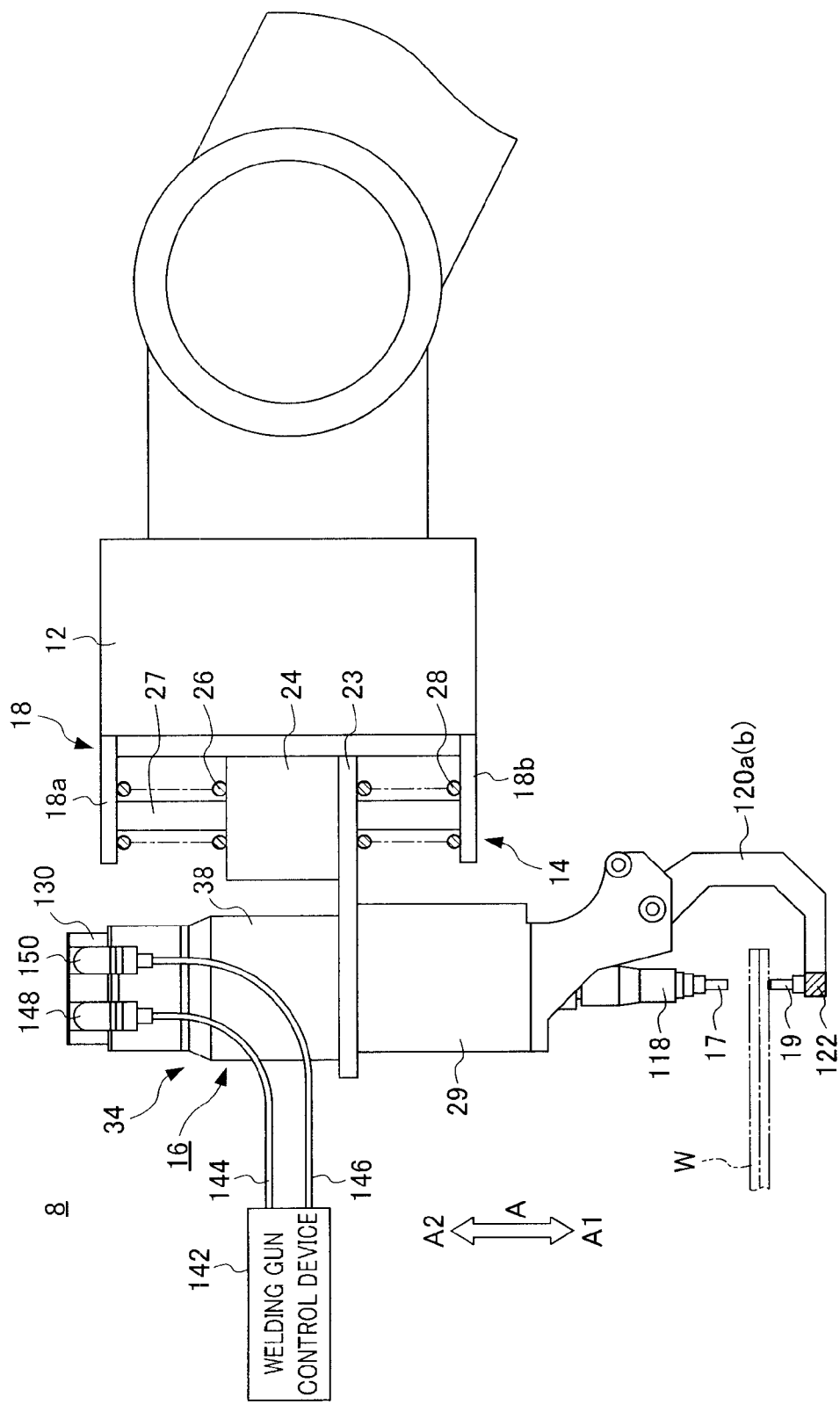
FIG. 7 is a view showing a state in which a welding gun according to a second embodiment of the present invention is attached to a leading end of a robot arm.

FIG. 7 is a partially simplified side view showing a welding gun 8 according to the second embodiment of the present invention in a state attached to a leading end of a robot arm 12. In the present embodiment, the welding gun 8 is configured as a C-type welding gun in which an electrode tip 17, which moves relative to an electrode tip 19 that is fixed, moves in a linearly stroke to open and close between the fixed electrode tip 19 and the moveable electrode tip 17.

The welding gun 8 includes a gun support portion 14 and a gun main body 16. This gun support portion 14 attaches to the leading end of the robot arm 12 and supports the gun main body 16. The gun support portion 14 is provided with a gun support bracket 18. This gun support bracket 18 includes a top plate 18a and a bottom plate 18b that extends in parallel with this top plate 18a. A guide bar 27 is bridged between the top plate 19a and the bottom plate 18b.

A plate 23, which is slidable in the axial direction of the guide bar 27 and parallel to the top plate 18a and the bottom plate 18b, fits to the guide bar 27. A support 24 of a cabinet shape is arranged on top of the plate 23 on a side near the robot arm 12, and a first coil spring 26 wound around the guide bar 27 is interposed between the top plate 18a and the support 24. Similarly, a second coil spring 28 wound around the guide bar 27 is interposed between the bottom plate 18b and the plate 23.

Figure 8:
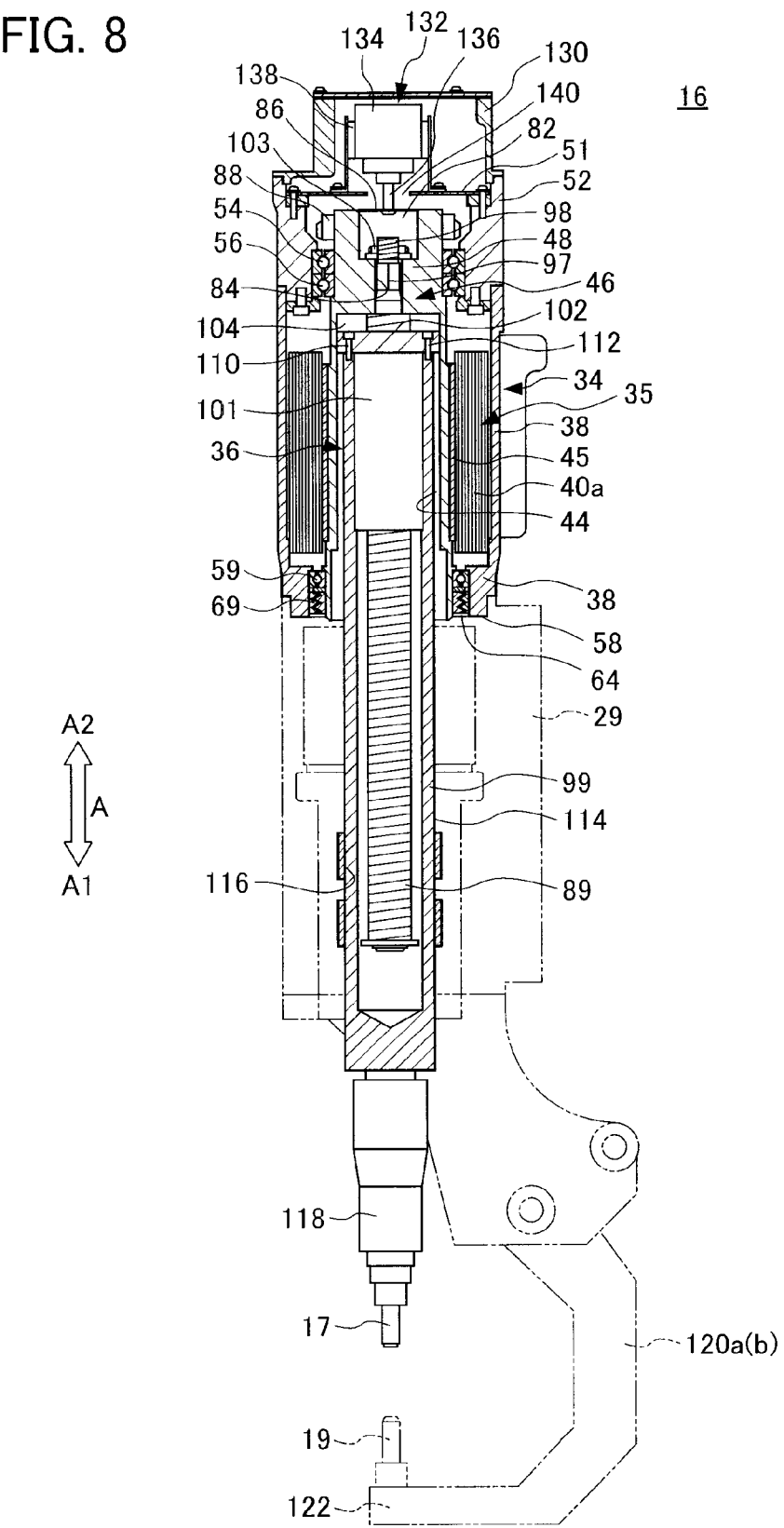
FIG. 8 is a cross-sectional view showing a configuration of the welding gun in FIG. 7.

A casing 29 configuring a gun main body portion 16 is fastened and retained to the plate 23 on a side separated from the robot arm 12. As shown in FIGS. 7 and 8, the gun main body portion 16 includes the moveable electrode tip 17 and the fixed electrode tip 19, which form a pair of electrode tips. Then, under the rotational action of the ball nut 89 coupled to the hollow motor rotating mechanism 34, the moveable electrode tip 17 is moved in a linear stroke relative to the fixed electrode tip 19 to open and close between the moveable electrode tip 17 and the fixed electrode tip 19.

As shown in FIG. 8, the welding gun 8 includes the hollow motor rotating mechanism 34 that is provided with a hollow rotor 46 accommodated to be slidable inside a motor housing 38, a ball screw 89 that is mounted to an end portion of the hollow rotor 46, and a pressing rod 99 that threads together with the ball screw 89 and moves in a stroke projecting to an A1 side of the arrow A from the motor housing 38 under the rotational action of the ball screw 89.

The hollow motor rotating mechanism 34 includes the motor housing 38 that is fixed to the casing 29, a stator 35 that is fixed inside of this motor housing 38, the hollow rotor 46 that is rotatably accommodated inside the motor housing 38 and has a hollow part 44 formed in the center thereof, and a motor housing cover 51 that is provided to one side (A2 side of the arrow A) of an end portion 48 of this hollow rotor 46. A coil 35a configuring the stator 35 is disposed in a ring shape inside of the motor housing 38.

A tube member 52 is concentrically threaded closed on an end portion of the motor housing 38 on an A2 side of the arrow A, and a first bearing 54 and a second bearing 56 are interposed between the inner circumferential surface of this tube member 52 and the outer-circumferential surface of the end portion 48 of the hollow rotor 46.

Figure 9:
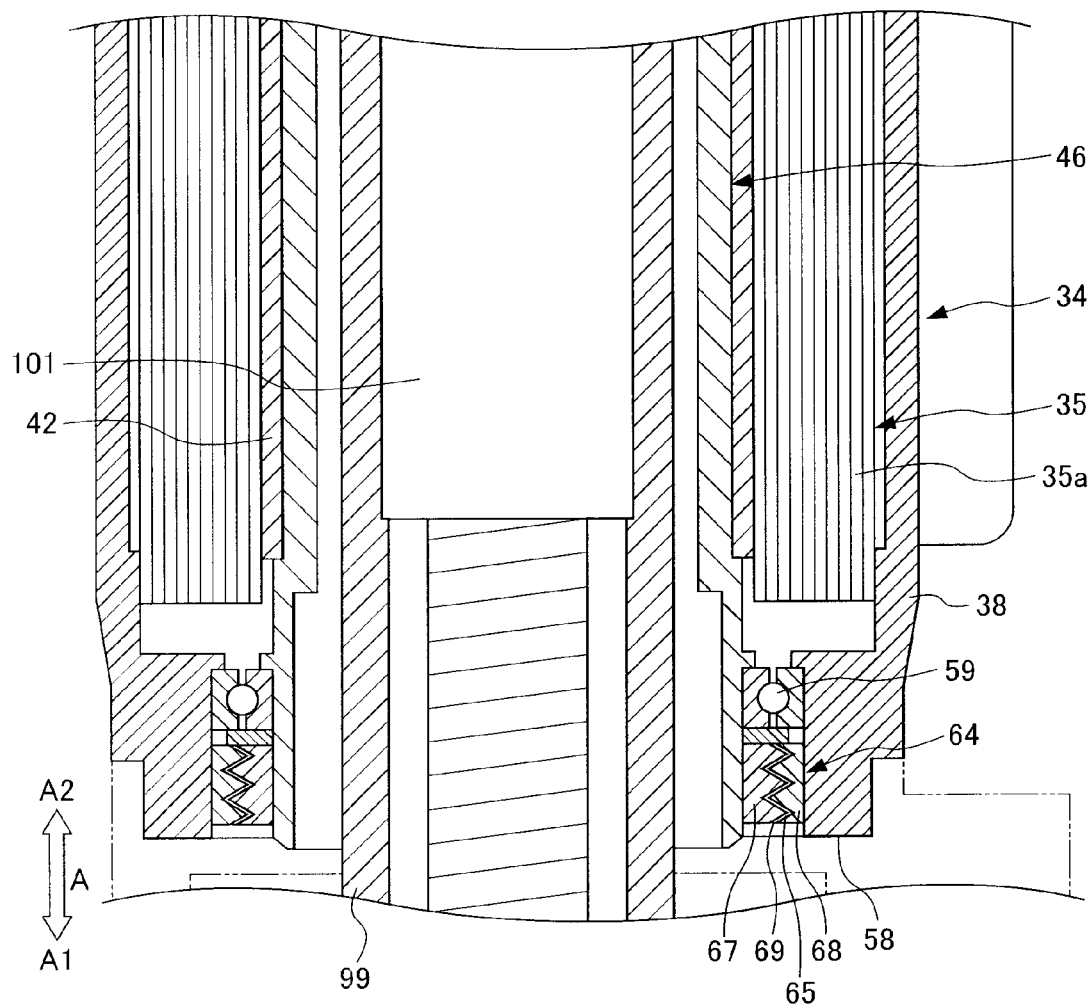
FIG. 9 is a magnified view showing the inside of a hollow motor rotating mechanism of the welding gun in FIG. 7.
Figure 10:
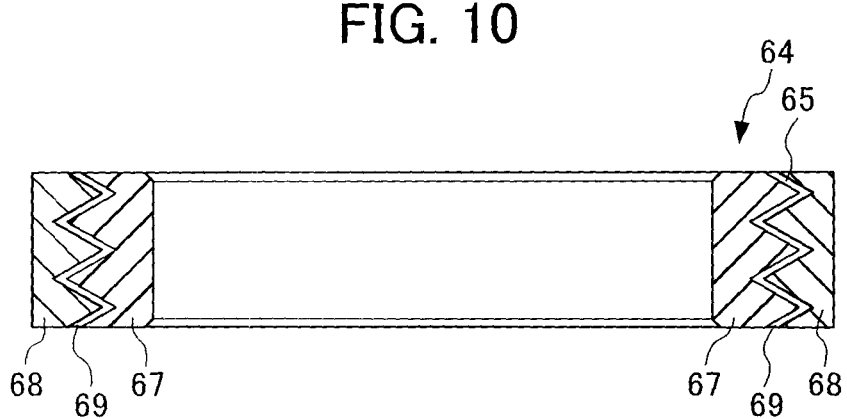
FIG. 10 is a magnified view showing the inside of a labyrinth seal of the welding gun in FIG. 7.

As shown in FIGS. 8 and 9, a noncontact-type labyrinth seal 64 that seals a gap between the motor housing 38 and the hollow rotor 46 is installed at an end portion 58 (A1 side of the arrow A) of the motor housing 38, which is a projecting side of the pressing rod 99. As shown in FIGS. 9 and 10, the labyrinth seal 64 includes an inner seal 67 of a wave shape that is disposed inside of the hollow rotor 46 to be fixed to the hollow rotor 46, and an outer seal 68 that is disposed facing the inner seal 67 and fixed to the motor housing 38 to be disposed on a side of the motor housing 38 in a noncontact state with the outside of the inner seal 67.

The outside surface of this inner seal 67 and the inside surface of the outer seal 68 are formed by a plurality of extremely small convexities and concavities respectively formed in wave shapes. In addition, one convexity configuring the outside surface of this inner seal 67 is disposed to be mutually facing one concavity configuring the inside surface of the outer seal 68 in a noncontact state, and one convexity configuring the inner seal 67 is disposed to be mutually facing one convexity configuring the inside surface of the outer seal 68, both forming a constant gap.

A grease 65 having a self-sealing property is enclosed in a gap 69 between the inner seal 67 and the outer seal 68 configuring the labyrinth seal 64. Therefore, the hollow rotor 46 and the motor housing 38 are fixed in a noncontact state through the labyrinth seal 64. As a result, when the hollow rotor 46 rotates, the inner seal 67 being fixed to the hollow rotor 46 rotates together therewith according to the rotation of the hollow rotor 46. However, the outer seal 68 being fixed to the motor housing 38 remains still along with the motor housing 38, without rotating following the rotation of the hollow rotor 46. In the present specification, "self-sealing property" indicates a characteristic of filling gaps by way of swelling deformation, and "grease having a self-sealing property" indicates a grease having such a characteristic.

Due to having a self-sealing property, the grease 65 can adhere tightly in the gap 69 between the inner seal 67 and the outer seal 68 and maintain this state without scattering from the inside of the gap 69. As a result, foreign matter such as water and debris can be prevented from penetrating inside the gap 69 for an extended period of time. In addition, even in a case of the grease 65 discharging from the gap 69 between the inner seal 67 and the outer seal 68 due to the hollow rotor 46 rotating, the grease 65 can prevent the penetration of foreign matter such as water or welding sputter to inside the gap 69 by forming a seal at the discharge point by way of its self-sealing property.

As shown in FIGS. 8 and 9, a third bearing 59 is installed against the labyrinth seal 64, provided in the end portion 58 (A1 side of the arrow A) of the motor housing 38, on the A2 side of the arrow A of the labyrinth seal 64. The third bearing 59 is provided inside of the motor housing 38 adjacent to the labyrinth seal 64.

As shown in FIG. 8, the motor housing 38 has a substantially cylindrical shape, and is configured from aluminum, for example.

As shown in FIG. 8, an opening part 82 of a concave shape is formed at a top part of the end portion 48 of the hollow rotor 46, and a splined hole 84 formed to penetrate through the center of the end portion 48 is in communication with the inner side end portion of this opening part 82. A thin plate 86 is fixed to the top of the end portion 48, and blocks the opening part 82. A tightening nut 88 threads together with the upper-outer circumference of the end portion 48 of the hollow rotor 46, and is illustrated in a state in which the tightening nut 88 is separated from the first bearing 54; however, the first bearing 54 is precompressed by this tightening nut 88 during operation, whereby backlash of the hollow rod 46 is prevented in the axial direction.

A feed screw mechanism 36 includes the ball screw 89 that is mounted to the end portion 48 of the hollow rotor 46, a nut member 101 that threads together with the ball screw 89, and the pressing rod 99 fastened to the nut member 101. The ball screw 89 integrally includes a splined shaft portion 97 that fits together with the splined hole 84 provided in the end portion 48 of the hollow rotor 46, and a threaded portion 98 that is provided at an end portion of this splined shaft portion 97. The ball screw 89 is fixed to the hollow rotor 46 by way of threading a nut 103 with the threaded portion 98.

An end face 102 of the nut member 101 on an A2 side of the arrow A faces the end portion 48 side of the hollow rotor 46, and a shock-absorbing member 104 is fastened to this end face 102 by way of screws or the like. The nut member 101 and the pressing rod 99 are integrally fixed via screws 110 and 112 disposed at opposing positions of the shock-absorbing member 104.

The pressing rod 99 is configured to be long in the A1-A2 direction of the arrow A, is disposed in the hollow part 44 of the hollow rotor 46, and has splines 114 formed in an outer-circumferential portion thereof. These splines 114 engage with the splined holes 116 provided to the casing 29, and have a whirl-stop function for the pressing rod 99 and the nut member 101. The moveable electrode tip 17 is removably mounted to a leading end portion of the pressing rod 99 on the A1 side of the arrow A via a holder.

As shown in FIG. 7, a set of yokes 120a and 120b of a C-shape disposed in parallel is fastened to the casing 29 so as to extend downward towards the A1 direction of the arrow A. The fixed electrode tip 19 is removably retained in a retaining member 122 attached between the yokes 120a and 120b.

As shown in FIG. 8, a head cover 130, which is a top part of the motor housing cover 51, is attached to the hollow motor rotating mechanism 34 on an A2 side of the arrow A. An encoder 132 for detecting the rotation angle of the hollow rotor 46 is disposed inside this head cover 130. This encoder 132 includes an encoder main body 134 and an input shaft 136 that projects from the encoder main body 134 to the pressing rod side (A1 side of the arrow A). The encoder main body 134 is retained by a stay 138 of cylindrical shape fastened to the motor housing cover 51. The input shaft 136 passes through a hole 140 provided substantially in the center of the motor housing cover 51, and is coupled to the thin plate 86.

As shown in FIG. 7, a first electrical power source connection opening 148 and a second electrical power source connection opening 150 of substantially L-shape, for connecting drive-power wires 144 and 146 from a welding gun control unit 142, which is the drive source that causes the hollow motor rotating mechanism 34 and the encoder 132 to operate, are provided in a side surface of the head cover 130.

Operation of the welding gun 8 configured in this way will be explained hereinafter.

When electrical power is supplied from the welding gun control unit 142 to the hollow motor rotating mechanism 34, electric current passes through the coil 35a, thereby generating a magnetic field, and torque is generated through the interaction between the magnetic fields of the stator 35 and the magnet 45 of ring shape, which opposes the stator 35. As a result, the hollow rotor 46 configuring the hollow motor rotating mechanism 34 rotates.

Under the rotational action of the hollow rotor 46, the ball screw 89 of the feed screw mechanism 36 rotates, and the nut member 101 threaded together with this ball screw 89 moves in one axial direction (A1 direction of the arrow A) of the hall screw 89 integrally with the pressing rod 99. This is because the splines 114 formed in the outer-circumferential surface of the pressing rod 99 engage with the splined hole 116 of the casing 29, whereby rotation of the pressing rod 99 and the nut member 101 is restricted.

Therefore, the moveable electrode tip 17 retained to the holder 118 fastened to the leading end portion of the pressing rod 99 moves in the A1 direction of the arrow A, whereby a work W is compressed and retained by the fixed electrode tip 19 and the moveable electrode tip 17. In this state, high current is supplied between the moveable electrode tip 17 and the fixed electrode tip 19, whereby the work W is spot welded.

Herein, the hollow rotor 46 and the motor housing 38 are fixed in a noncontact state via the labyrinth seal 64. Therefore, when the hollow rotor 46 configuring the hollow motor rotating mechanism 34 rotates, among the seals configuring the labyrinth seal 64, the inner seal 67 fixed to the hollow rotor 46 rotates together with rotation of the hollow rotor 46. In contrast, among the seals configuring the labyrinth seal 64, the outer seal 68 fixed to the motor housing 38 remains still along with the motor housing 38, and does not rotate following the rotation of the hollow rotor 46. In this case, as shown in FIG. 10, the penetration of foreign matter such as water and debris into the hollow motor rotating mechanism 34, which is enclosed by the hollow rotor 46 and the motor housing 38, can be prevented since the grease 65 is enclosed in the gap 69 between the inner seal 67 and the outer seal 68.

In addition, although a neighboring region of the hollow rotor 46 and the motor housing 38 is low temperature prior to the start of operation such as when starting the pressing rod 99, the gap between the hollow rotor 46 and the motor housing 38 is sealed in a noncontact state by the labyrinth seal; therefore, the characteristics of the oil used in the seal member have no influence, even when at low temperature. As a result, the frictional resistance between the hollow rotor 46 and the motor housing 38 can be reduced even when at low temperature. Therefore, the hollow rotor 46 can easily be made to rotate with a small amount of force, whereby the pressing rod 99 can be made to move with little pressure. In addition, the labyrinth seal 64 is noncontact-type and has little resistance when at low temperature; therefore, false detection will not occur when at low pressure, even at low temperature. As a result, a situation in which problems occur in the control of the hollow motor rotating mechanism 34 can be prevented, while maintaining stability in the pressing force also at low pressure. According the welding gun of the present embodiment as described above, a stable pressurizing force can always be provided on the pressing rod 99, and a situation in which the pressing rod 99 will not move due to a temperature change can be prevented from occurring.

In addition, the grease 65 enclosed in the gap 69 between the inner seal 67 and the outer seal 68 has a self-sealing property; therefore, it is possible to make the grease 65 adhere tightly inside the gap 69 between the inner seal 67 and the outer seal 68 and maintain this state without scattering from the gap 69, even if the hollow rotor 46 rotates at high speed, for example. With this, foreign matter such as water and debris can be prevented from penetrating into the hollow motor rotating mechanism 34, which is enclosed by the hollow rotor 46 and the motor housing 38, over an extended period of time. In addition, even in a case of the grease 65 discharging from the gap 69 between the inner seal 67 and the outer seal 68 due to the hollow rotor 46 rotating, since the grease 65 has a self-sealing property, the penetration of foreign matter such as water and welding sputter to inside the gap 69 can be prevented by forming a seal at the discharge point. A multipurpose extreme pressure grease preferably having a distinct viscosity, excelling in sealing properties, and not easily scattering from rotation, and furthermore, excelling in water resistance and also being able to withstand high shock loads, is suitable as such a grease 65. A multipurpose grease preferably having a distinct viscosity, excelling in sealing properties, and having a characteristic of not easily scattering from rotation, and more specifically, excelling in water resistance and also being able to withstand high shock loads, is suitable as such a grease 65. Herein, the revolution speed of the rotor assumed for the case of "the grease will not scatter even if the rotor is rotating" can be considered as being no higher than 3,000 rpm for the case of the welding gun 8, for example. In addition, 100 kgf may be assumed as the pressurizing force on the pressing rod when at low pressure.

Moreover, although a configuration has been explained in the present embodiment in which the ball screw 89 is mounted to an end portion of the hollow rotor 46 and the hollow rotor 46 is made to be rotatable relative to the pressing rod 99, the present invention is not limited thereto. For the configuration of the hollow rotor, it is evident that various configurations are possible depending on the implementation, such as mounting a nut to and portion of the hollow rotor, for example, so long as the hollow rotor is in a configuration rotatable relative to the pressing rod.

It should be noted that the present invention is not to be limited to the aforementioned embodiments, and modifications, improvements, etc. within a scope that can achieve the object of the present invention are included in the present invention. For example, although the welding gun 8 has been explained in the aforementioned embodiment as a C-type welding gun in which the moveable electrode top 17 moves relative to the fixed electrode tip 19 in a linear stroke to open and close between the fixed electrode tip 19 and the moveable electrode tip 17, the present invention is not to be limited thereto. The present invention may be configured as an X-type welding gun that causes the moveable electrode tip 17 to swing relative to the fixed electrode tip 19 so as to sandwich together.

What is claimed is:

1. A welding gun comprising:
    a feed screw mechanism that is coupled to a servo motor and has a rod that reciprocally moves in a predetermined direction by way of torque applied by the servo motor, and
    a moveable electrode tip that is connected to a leading end portion of the rod and opens and closes relative to a fixed electrode tip in accordance with reciprocal movement of the rod, wherein
    the servo motor includes a motor housing in which a hollow part accommodating a portion of the rod so as to be reciprocally moveable is formed,
    a vent that ventilates the hollow part with ambient air is formed in the motor housing,
    an ambient air connection device includes a vent pipe that has a first end connected to the vent and a second end disposed to be able to ventilate with ambient air,
    the ambient air connection device includes an inner cover as a moisture barrier of a box shape that encloses around the second end of the vent pipe,
    the inner cover includes a first side surface and second side surface and has side-surface opening parts formed in the first side surface of the inner cover,
    the ambient air connection device includes an outer cover of a box shape that encloses the inner cover to interpose a layer of air between the inner cover and the outer cover,
    the outer cover includes a first side surface and a second side surface and has outer-cover skirt openings formed on the second side surface of the outer cover, said outer cover first side surface facing the inner cover first side surface such that said outer cover second side surface, in which are formed said outer-cover skirt openings, does not face the inner cover first side surface, in which are formed the side-surface opening parts, and wherein
    the outer cover includes exterior cutouts in the four corners of a ceiling surface facing the outer-cover skirt openings.

2. The welding gun according to claim 1, wherein
    the ambient air connection device includes a filter that covers around the second end of the vent pipe inside of the inner cover.

3. The welding gun according to claim 1, wherein the side-surface opening parts are bent toward the outside.

* * * * *